(12) United States Patent
Adachi (10) Patent No.: US 9,952,118 B2
(45) Date of Patent: Apr. 24, 2018

(54) ECCENTRICITY AMOUNT OBTAINMENT METHOD AND ECCENTRICITY AMOUNT OBTAINMENT DEVICE

(71) Applicant: OLYMPUS CORPORATION, Hachioji-shi, Tokyo (JP)

(72) Inventor: Kanato Adachi, Kawasaki (JP)

(73) Assignee: OLYMPUS CORPORATION, Tokyo (JP)

( * ) Notice: Subject to any disclaimer, the term of this patent is extended or adjusted under 35 U.S.C. 154(b) by 118 days.

(21) Appl. No.: 15/207,830

(22) Filed: Jul. 12, 2016

(65) Prior Publication Data

US 2016/0320263 A1    Nov. 3, 2016

Related U.S. Application Data

(63) Continuation of application No. PCT/JP2015/051264, filed on Jan. 19, 2015.

(30) Foreign Application Priority Data

Jan. 20, 2014    (JP) ................. 2014-007940

(51) Int. Cl.
*G01M 11/08* (2006.01)
*G01M 11/02* (2006.01)

(52) U.S. Cl.
CPC .......... *G01M 11/08* (2013.01); *G01M 11/025* (2013.01); *G01M 11/0221* (2013.01)

(58) Field of Classification Search
CPC . G01M 11/025; G01M 11/08; G01M 11/0221
USPC .................................. 356/124–127
See application file for complete search history.

(56) References Cited

U.S. PATENT DOCUMENTS 7,046,351 B2 * 5/2006 Ito ................. G01M 11/0221
356/127

FOREIGN PATENT DOCUMENTS

| JP | 2006112811 A | 4/2006 |
|----|--------------|--------|
| JP | 2008185832 A | 8/2008 |
| JP | 4323230 B2   | 9/2009 |
| JP | 2010054677 A | 3/2010 |

(Continued)

OTHER PUBLICATIONS

International Search Report (ISR) dated Apr. 14, 2015 issued in International Application No. PCT/JP2015/051264.

*Primary Examiner* — Hina F Ayub
*Assistant Examiner* — Amanda Merlino
(74) *Attorney, Agent, or Firm* — Holtz, Holtz & Volek PC (57) ABSTRACT

According to one aspect, an eccentricity amount obtainment method is a method of obtaining shift eccentricity amounts of lens frames through in a lens barrel that includes the plurality of lens frames having lens cells, the eccentricity amount obtainment method including arranging, in each of the lens cells, a flat plate member on which an index is formed and which has optical transparency and arranging the lens frames in the lens barrel in a prescribed order so as to assemble an assembly, a emitting illumination light to the flat plate members, obtaining pieces of information related to positions of the indexes formed on the flat plate members, and obtaining, as the shift eccentricity amounts of the lens frames, the positional displacement amounts with respect to the indexes formed on the flat plate members with respect to an arbitrary position.

8 Claims, 4 Drawing Sheets

(56) References Cited

FOREIGN PATENT DOCUMENTS

JP 2013076944 A 4/2013

\* cited by examiner

ECCENTRICITY AMOUNT OBTAINMENT METHOD AND ECCENTRICITY AMOUNT OBTAINMENT DEVICE

CROSS REFERENCE TO RELATED APPLICATIONS

This is a Continuation application of PCT application No. PCT/JP2015/051264, filed Jan. 19, 2015, which was not published under PCT Article 21(2) in English.

This application is based upon and claims the benefit of priority from the prior Japanese Patent Application No. 2014-007940, filed Jan. 20, 2014, the entire contents of which are incorporated herein by reference.

BACKGROUND OF THE INVENTION

Field of the Invention

The present invention is related to an eccentricity amount obtainment method and an eccentricity amount obtainment device that obtain a shift eccentricity amount and a tilt eccentricity amount of a lens frame (lens cell) in a lens barrel that holds a plurality of lens frames having lens cells.

Description of the Related Art

Optical devices having a plurality of lenses are subject to lens eccentricity such as shift eccentricity, in which the position of the optical axis of a lens changes, and tilt eccentricity, in which the angle of the optical axis of a lens changes. Components of digital cameras etc. have conventionally been adjusted so that the shift eccentricity amounts and the tilt eccentricity amounts measured for lenses in a lens barrel having a plurality of lenses are within tolerable ranges (Japanese Patent No. 4323230 for example).

SUMMARY OF THE INVENTION

An aspect of the method is an eccentricity amount obtainment method of obtaining a shift eccentricity amount of a lens frame in a lens barrel including a plurality of lens frames that have lens cells, the eccentricity amount obtainment method including arranging, in each of the lens cells, a flat plate member on which an index is formed and which has optical transparency and arranging the lens frames in the lens barrel in a prescribed order so as to assemble an assembly, emitting illumination light to the flat plate members, obtaining pieces of information related to positions of the indexes formed on the flat plate members, and obtaining, as the shift eccentricity amounts of the lens frames, the positional displacement amounts with respect to the indexes formed on the flat plate members with respect to an arbitrary position.

Another aspect of the method is an eccentricity amount obtainment method of obtaining a tilt eccentricity amount of a lens frame in a lens barrel including a plurality of lens frames that have lens cells, the eccentricity amount obtainment method including an arranging, in each of the lens cells, a flat plate member which has optical transparency and arranging the lens frames in the lens barrel in a prescribed order so as to assemble an assembly, emitting parallel light from a position facing a flat plate member arranged at an outermost position among the flat plate members, in such a manner that the parallel light is transmitted through the respective flat plate members, obtaining an angle information obtainment related to an angle of reflected light of the parallel light from each of the flat plate members, and obtaining a displacement amount of the angle with respect to the reflected light of the parallel light from each of the flat plate members with respect to an arbitrary reference axis as the tilt eccentricity amount of each of the lens frames.

An aspect of the device is an eccentricity amount obtainment device that obtains a shift eccentricity amount of a lens frame in a lens barrel including a plurality of lens frames that have lens cells, the eccentricity amount obtainment device including an image pickup apparatus configured to emit illumination light to a flat plate member which is arranged in each of the plurality of lens cells, on which an index is formed, and which has optical transparency, and configured to obtain pieces of information related to positions of the indexes formed on the flat plate members, and a processor configured to obtain, as the shift eccentricity amounts of the lens frames, the positional displacement amounts with respect to the indexes formed on the flat plate members with respect to an arbitrary position.

Another aspect of the device is an eccentricity amount obtainment device that obtains a tilt eccentricity amount of a lens frame in a lens barrel including a plurality of lens frames that have lens cells, the eccentricity amount obtainment device including an image pickup apparatus configured to emit parallel light from a position facing a flat plate member arranged at an outermost position among the flat plate members which are arranged in the plurality of lens cells and which have optical transparency, in such a manner that the parallel light is transmitted through the respective flat plate members, and configured to obtain information related to an angle of reflected light of the parallel light from each of the flat plate members, and a processor configured to obtain a displacement amount of the angle with respect to the reflected light of the parallel light from each of the flat plate members with respect to an arbitrary reference axis as the tilt eccentricity amount of each of the lens frames.

DETAILED DESCRIPTION OF INVENTION

Incidentally, the above shift eccentricity amounts and tilt eccentricity amounts of lenses are information including all types of eccentricity including one based on the perfection level of each arranged lens, one based on the perfection level of a lens frame and one based on the operation of arranging each lens and each lens frame. This makes it difficult for the measurement of eccentricity amounts of lenses conducted after the arrangement of the lenses to determine whether the lenses themselves involve eccentricity, the lens frames (lens cells) having the lenses arranged therein involve eccentricity or the operation of arranging the lenses or lens frames caused eccentricity.

This makes it impossible to feed the measured shift eccentricity amounts or tilt eccentricity amounts of lenses back to for example the modification of the shapes of mold portions of lens frames, i.e., the modification the shapes of the dies that transfer the shapes to the mold portions. Also, it is similarly impossible to feed the measured shift eccentricity amounts or tilt eccentricity amounts of lenses back to the determination of the amount of adhesive applied to lenses for assembling the lens barrel or to methods of fixing respective components in the lens barrel.

Figure 1:
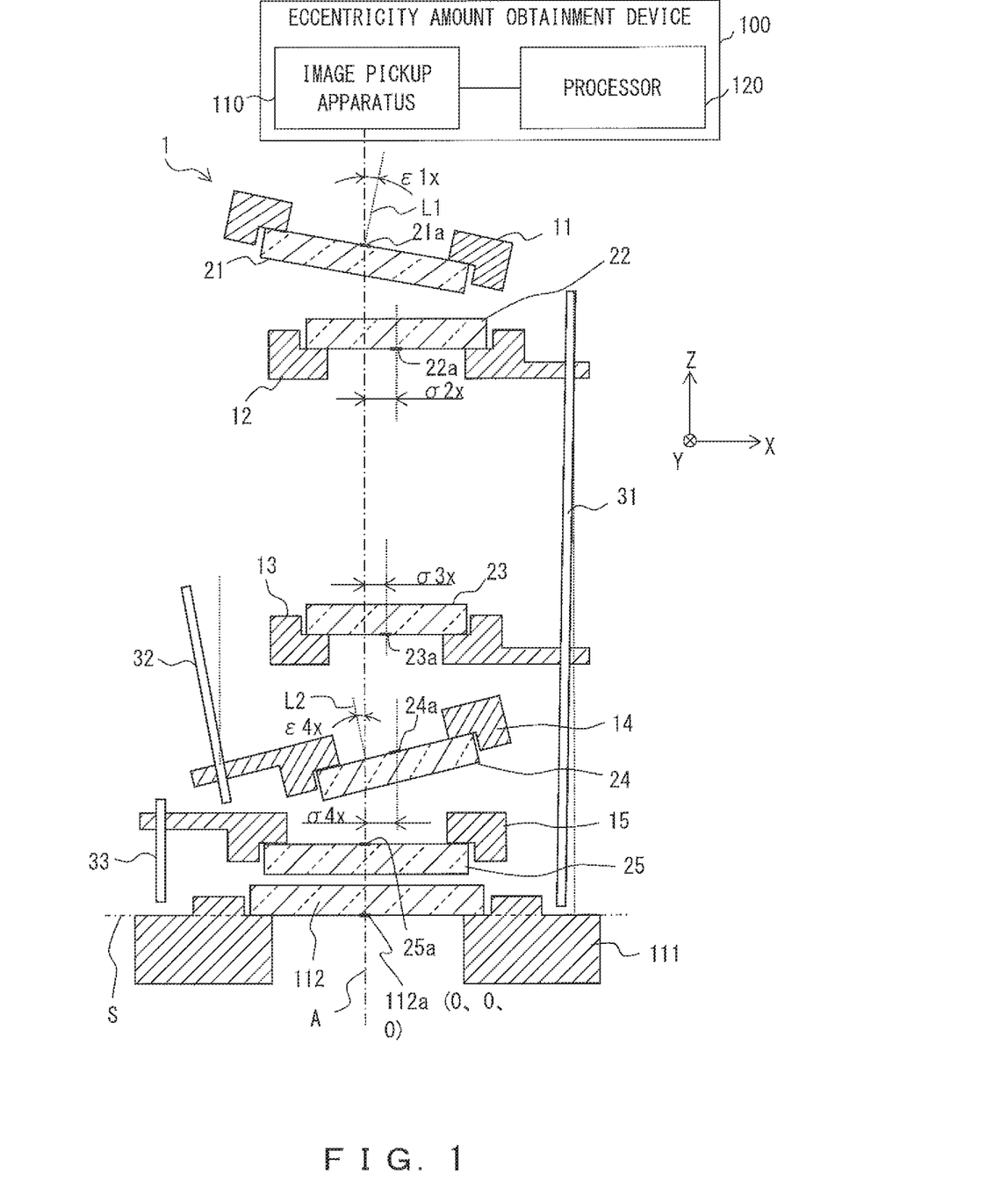
FIG. 1 is a sectional view showing the internal configuration of an assembly according to an embodiment.

Hereinafter, by referring to the drawings, explanations will be given for an eccentricity amount obtainment method and an eccentricity amount obtainment device according to the embodiments. FIG. 1 is a sectional view showing the internal configuration of an assembly 1 according to an embodiment.

As shown in FIG. 1, the assembly 1 includes a plurality (for example, five or the first through the fifth) of lens frames 11 through 15. Each of the lens frames 11 through 15 has a lens cell in which a lens is arranged. For example, a second lens frame 12 and a third lens frame 13 are supported by a first shaft 31. Also, a fourth lens frame 14 is supported by a second shaft 32 while a fifth lens frame 15 is supported by a third shaft 33. The first through third shafts 31 through 33 are provided in the lens barrel. Note that the first lens frame 11 is fixed to for example a lens barrel that is not shown. As described above, the respective lens frames 11 through 15 are fixed to the lens barrel directly or indirectly via for example the first through third shafts 31 through 33.

The lens cells of the first through fifth lens frames 11 through 15 are provided with first through fifth flat plate members 21 through 25, respectively. The flat plate members 21 through 25 are fixed to the lens frames 11 through 15. Methods of fixing the flat plate members 21 through 25 are not particularly limited, and may be arbitrary methods such as bonding, etc. Note that slight optical transparency in the flat plate members 21 through 25 is sufficient to allow an image pickup apparatus 110, which will be described later, to pick up images of the plurality of flat plate members 21 through 25, whereas it is desirable that the flat plate members 21 through 25 be transparent.

Indexes 21a through 25a are formed at for example the centers of the surfaces, of the flat plate members 21 through 25, that are fixed to the lens frames 11 through 15. Examples of the flat plate members 21 through 25 include a micrometer and a reticle plate. The indexes 21a through 25a may be scales or marks like scratches, and are not particularly limited as long as they permit observation. Also, it is sufficient for the flat plate members 21 through 25 to be flat on portions on which the indexes 21a through 25a are formed. Accordingly, the flat plate members 21 through 25 may have a greater thickness at for example the peripheral portions than the central portions.

An eccentricity amount obtainment device 100 includes an image pickup apparatus 110 and a processor 120. Examples of the image pickup apparatus 110 include a toolmaker's microscope and a collimator. It is also possible to consider a group including the eccentricity amount obtainment device 100 and a cradle 111 on which the assembly 1 is mounted as an eccentricity amount obtainment system. The assembly 1 is mounted on the cradle 111 in a state wherein the assembly 1 is positioned at the cradle 111 by a positioning member such as for example a pin. A reference-coordinate flat plate member 112 is fixed to this cradle 111 by means of for example bonding.

An index 112a is formed at the center of the surface (reference surface), of the reference-coordinate flat plate member 112, that is fixed to the cradle 111. Examples of the reference-coordinate flat plate member 112 include a micrometer and a reticle plate, similarly to the first through fifth flat plate members 21 through 25. It is necessary to emit illumination light by using an illumination light source (not shown) in order to secure an amount of light for picking up an image. It is desirable that a material with a high transparency (a transparent body such as glass for example) be used when illumination light is emitted from the cradle 111 side to the image pickup apparatus 110 side so as to cause the light to be transmitted for picking up an image. It is also desirable that a material with a high reflectance (a metal such as aluminum for example) be used when light is emitted from the image pickup apparatus 110 side to the cradle 111 side so as to cause the light to be reflected for picking up an image. The types of illumination light sources are not particularly limited, and anything that produces a sufficient amount of light for picking up an image can be used. For example, the illumination light source may be a white LED etc. As will be described later in detail, parallel light is used as the illumination light when a tilt eccentricity amount is to be obtained.

Note that the surfaces on which the indexes 21a through 25a and 112a are formed are not particularly limited, and these indexes may be formed on the surfaces on the opposite sides of the flat plate members 21 through 25 to the sides of the surfaces that are fixed to the lens frames 11 through 15 or on the surface on the opposite side of the reference-coordinate flat plate member 112 to the side of the reference surface S.

The index 112a of the reference-coordinate flat plate member 112 may be used as a reference position for obtaining information related to the positions of the first through fifth flat plate members 21 through 25. Note that the index 112a is just an example of an index included in the cradle 111, and may be formed directly on for example the cradle 111. Also, as the reference position, any one of the indexes 21a through 25a of the flat plate members 21 through 25 (an example of an index of a flat plate member in one lens frame) may be used. As an example of effects, when the reference position is set on the cradle 111 side (the index 112a of the reference-coordinate flat plate member 112), the reference position can be set regardless of the eccentricity of the lens frames 11 through 15. Also, when the reference position is set on the side of the flat plate members 21 through 25 (indexes 21a through 25a) of the lens frames 11 through 15, the structure of the eccentricity amount obtainment system including the eccentricity amount obtainment device 100 can be simplified by for example omitting the reference-coordinate flat plate member 112 etc.

Figure 2:
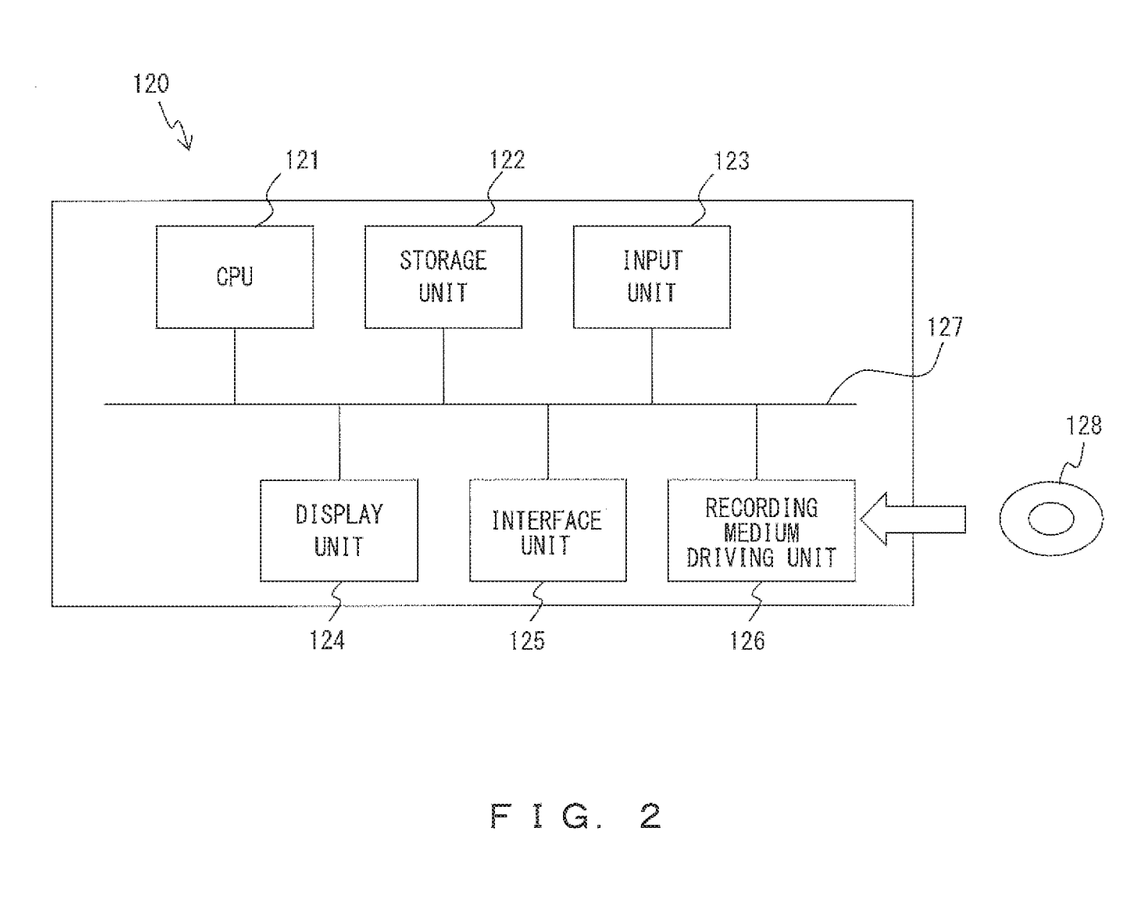
FIG. 2 shows an example of a hardware configuration of a computer that can be used as a processor according to an embodiment.

As the processor 120, for example a computer 120 as shown in FIG. 2 may be used. The computer 120 shown in FIG. 2 includes a CPU (central processing unit) 121, a storage unit 122, an input unit 123, a display unit 124, an interface unit 125 and a recording medium driving unit 126. These constituents are connected to each other via a bus line 127 so that various types of data are exchanged between them.

The CPU 121 is an arithmetic processing unit that controls the overall operations of the computer 120. The CPU 121 reads and executes a program for obtaining a shift eccentricity amount and a tilt eccentricity amount, which will be described later, so as to execute a process of obtaining an eccentricity amount.

The storage unit 122 includes a ROM (read only memory), a RAM (random access memory), a hard disk, etc. The ROM is a read only semiconductor memory in which a prescribed basic control program has been recorded in advance. Note that a non-volatile memory, such as a flash memory etc., which can continue to hold stored data even while power is not being supplied can be used as the ROM.

The RAM is a random access semiconductor memory that is used as a working storage area on an as-needed basis when the CPU 121 executes various types of control programs.

The hard disk stores various types of control programs that are executed by the CPU 121 and stores various types of data.

The input unit 123 is for example a keyboard or a mouse, and obtains various types of information, input by the user, that are associated with manipulation contents, in response to manipulations made by the user on the computer 120, and transmits the obtained input information to the CPU 121.

The display unit 124 is for example a display device, and displays various texts and images. The interface unit 125 manages the exchange of various types of information between various types of devices such as the image pickup apparatus 110 connected to the processor 120.

The recording medium driving unit 126 is a device that reads various types of control programs and data stored in a portable recording medium 128. The CPU 121 may perform the process of obtaining an eccentricity amount by reading and executing a prescribed control program stored in the portable recording medium 128 via the recording medium driving unit 126.

An example of the portable recording medium 128 is a CD-ROM (Compact Disc Read Only Memory), a DVD-ROM (Digital Versatile Disc Read Only Memory), a flash memory provided with a USB-compatible connector, etc.

In order to operate the computer 120 as described above, a control program is first generated for making the CPU 121 execute the steps of the various processes of obtaining an eccentricity amount. The generated control program is stored in the hard disk device of the storage unit 122 or in the portable recording medium 127. Then, in response to a prescribed instruction given to the CPU 121, the control program is read and executed. Thereby, the computer 120 performs the operation for obtaining an eccentricity amount.

Incidentally, in the lens frames 11 through 15 shown in FIG. 15, positional displacement of the central axes may occur with respect to an arbitrary reference axis (an example of the reference position). In FIG. 1, positional displacement of X components, such as σ2x, σ3x and σ4x, of the central axes have occurred with respect to reference axis A in the second lens frame 12, the third lens frame 13, and the fourth lens frame 14. Reference axis A is an axis that is parallel to the Z axis and that intersects with the index 112a of the reference-coordinate flat plate member 112. Positional displacement amounts σ2, σ3 and σ4 involving X and Y components that have occurred with respect to reference axis A are the shift eccentricity amounts of the lens frames 12, 13 and 14, respectively. In the present embodiment, no positional displacement has occurred to the X or Y component in the first lens frame 11 and the fifth lens frame 15.

An angular displacement of the central axis can also occur with respect to an arbitrary reference axis in the lens frames 11 through 15. In FIG. 1, angular displacements such as ϵ1x and ϵ4x of X components of the central axis have occurred in the first lens frame 11 and the fourth lens frame 14 with respect to reference axis A. Angular displacement amounts ϵ1x and ϵ4x involving X and Y components that have occurred with respect to reference axis A are the tilt eccentricity amounts of the lens frames 11 and 14, respectively. In the present embodiment, no angular displacements have occurred to the X or Y component in the second lens frame 12, the third lens frame 13 and the fifth lens frame 15. This shift eccentricity amount and this tilt eccentricity amount may be caused by for example the shape of the mold of the lens frames 11 through 15, the shape of the mold of other portions (not shown) in the lens barrel, shifts or inclination of the shafts 31 through 33, etc.

Explanations will now be given for a method of obtaining shift eccentricity amounts of the lens frames 11 through 15. In the assembly 1 shown in FIG. 1, the flat plate members 21 through 25 on which the indexes 21a through 25a are formed and which have optical transparency, instead of the lenses that are to be arranged actually, are arranged in the lens cells of the lens frames 11 through 15, respectively. Also, the assembly 1 is assembled by arranging the lens frames 11 through 15 in the lens barrel (not shown) in a prescribed order (assembly step). This assembly step includes a step of mounting the assembly 1 on the cradle 111. In the case shown in FIG. 1, the lens frames 11, 12, 13, 14 and 15 are arranged in this order in the direction from the image pickup apparatus 110 to the cradle 111. Note that the flat plate members 21 through 25 may be arranged in the lens cells of the lens frames 11 through 15 after arranging the lens frames 11 through 15 in the lens barrel.

Next, a light source (not shown) emits illumination light to the flat plate members 21 through 25 and the reference-coordinate flat plate member 112 (illumination light emission step). Then, the image pickup apparatus 110 obtains (picks up an image of) position information on the X-Y plane that is orthogonal to the Z axis with respect to each of the indexes 21a through 25a of the flat plate members 21 through 25 in the lens frames 11 through 15 and the index 112a of the reference-coordinate flat plate member 112 (position information obtainment step). The Z axis is an axis parallel to light that is vertically incident on an image pickup sensor (not shown) of the image pickup apparatus 110. Note that it is also possible to employ a configuration in which the image pickup apparatus 110 obtains observation images of the indexes 21a through 25a of the flat plate members 21 through 25 and the index 112a of the reference-coordinate flat plate member 112 and the processor 120 obtains the position information. Also, it is desirable that the operation length of the objective lens of the image pickup apparatus 110 be long in order to bring the indexes 21a through 25a and 112a into focus.

Figure 3:
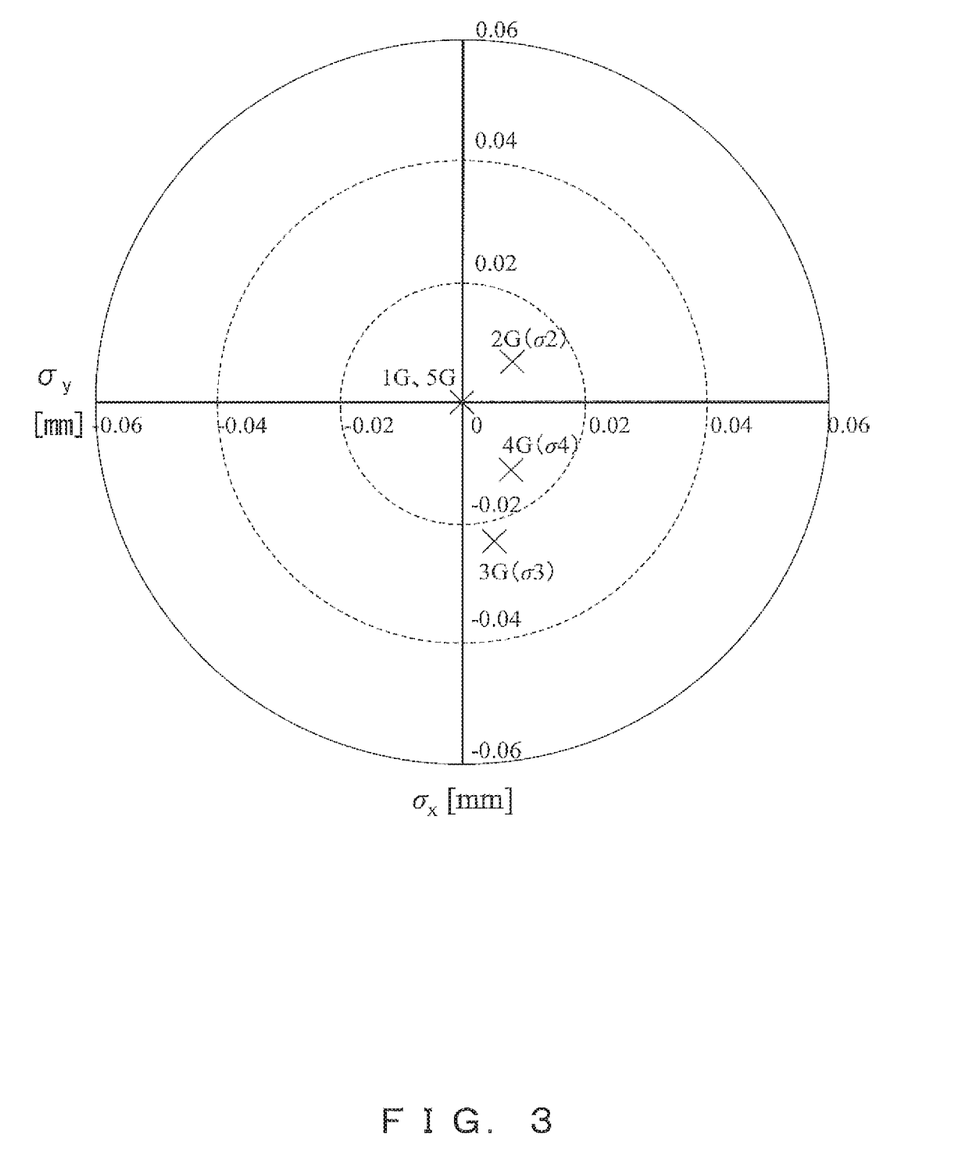
FIG. 3 shows shift eccentricity amounts measured according to an embodiment.

Then, the processor 120 obtains (calculates), as the shift eccentricity amounts of the lens frames 11 through 15, the positional displacement amounts of the indexes 21a through 25a of the flat plate members 21 through 25 with respect to the position of the index 112a of the reference-coordinate flat plate member 112 (shift eccentricity amount obtainment step). When shift eccentricity amounts are to be obtained, the image pickup apparatus 110 functions as an example of an image pickup apparatus that emits the illumination light to the flat plate members 21 through 25 so as to obtain information related to the positions of the indexes 21a through 25a. Also, the processor 120 functions as an example of a processor that obtains displacement amounts σ of the indexes 21a through 25a with respect to an arbitrary reference position as the shift eccentricity amounts of the lens frames 11 through 15. Shift eccentricity amounts obtained by the present embodiment are shown in FIG. 3. While FIG. 3 shows the position of the index 112a of the reference-coordinate flat plate member 112 (reference axis A) as the reference position, the reference position can be selected arbitrarily as described above and any one of for example the positions of the indexes 21a through 25a of the flat plate members 21 through 25 may be used as a reference.

In FIG. 3, the first through fifth lens frames 11 through 15 are denoted by "1G" through "5G". Also, in FIG. 3, the horizontal axis represents the positional displacement amount σx [mm] of X components and the vertical axis represents the positional displacement amount σy [mm] of Y components.

The shift eccentricity amounts and tilt eccentricity amounts, which will be described later, obtained for the lens frames 11 through 15 according to the present embodiment can be fed back to the modification of the shapes of mold portions of the lens frames 11 through 15 etc., i.e., the modification of the shapes of the dies that transfer the shapes to the mold portions. It is similarly possible to feed the shift eccentricity amounts and tilt eccentricity amounts obtained for the lens frames 11 through 15 according to the present embodiment back to the amount of adhesive applied for assembling lenses that are actually arranged in a lens barrel (not shown) and to methods of fixing respective components in a lens barrel (not shown).

In FIG. 1 and FIG. 3, the lens frame 11 is oriented toward the image pickup apparatus 110 and the lens frame 15 is oriented toward the cradle 111 so as to measure shift eccentricity amounts. However, the opposite orientation (the lens frame 11 is oriented toward the cradle 111 and the lens frame 15 is oriented toward the image pickup apparatus 110) may be adopted for the measurement.

Next, a method of obtaining tilt eccentricity amounts of the lens frames 11 through 15 will be explained. Similarly to the above case of obtaining shift eccentricity amounts, in the assembly 1 shown in FIG. 1, the flat plate members 21 through 25 having optical transparency are arranged in the lens cells of the lens frames 11 through 15. Also, the assembly 1 is assembled by arranging the lens frames 11, 12, 13, 14 and 15 in the lens barrel (not shown) in this order (assembly step). This assembly step includes a step of mounting the assembly 1 on the cradle 111. When only tilt eccentricity amounts are to be obtained, it is not necessary to form the indexes 21*a* through 25*a* on the flat plate members 21 through 25. However, when both shift eccentricity amounts and tilt eccentricity amounts are to be obtained, the indexes 21*a* through 25*a* formed on the flat plate members 21 through 25 allow shift eccentricity amounts and tilt eccentricity amounts to be obtained sequentially without the necessity of reassembling the assembly 1.

A light source (not shown) of the image pickup apparatus 110 emits parallel light from a position facing the flat plate member 21, which is located at the outermost position among the flat plate members 21 through 25 that are arranged in the lens frames 11 through 15 (the outermost position on the image pickup apparatus 110 side in the present embodiment). Also, the light is transmitted through the flat plate members 21 through 25 to reach the fifth flat plate member 25 and also to the reference-coordinate flat plate member 112 (parallel light emission step). Then, the image pickup apparatus 110 obtains angle information of the reflected light of the parallel light from each of the flat plate members 21 through 25 in the lens frames 11 through 15 and the reference-coordinate flat plate member 112. Note that, collimated light, which is obtained by substantially orienting the light of the light source only to a prescribed direction by using a collimated lens, laser light, etc. may be used as parallel light. The light source wavelength of the laser light is not particularly limited as long as a sufficient reflection intensity can be obtained from all the flat plate members 21 through 25 and 112.

Examples of methods of obtaining angle information are as follows. First, the image pickup apparatus 110 obtains (picks up an image of) position information on the X-Y plane that is orthogonal to the Z axis with respect to the reflected light of the parallel light from each of the flat plate members 21 through 25. Note that it is also possible to employ a configuration in which the image pickup apparatus 110 obtains an observation image of the reflected light from each of the flat plate members 21 through 25 and the processor 120 obtains the position information.

Figure 4:
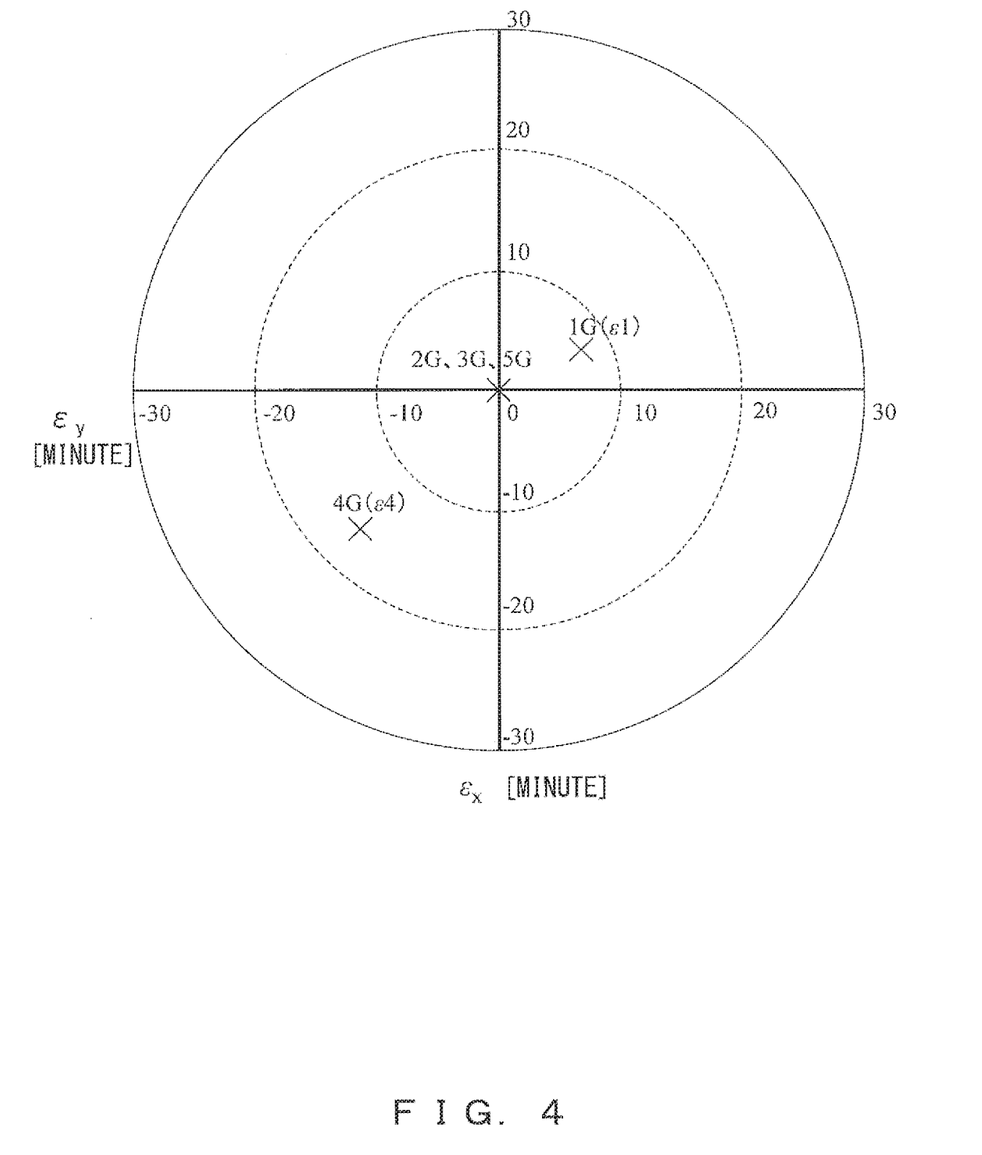
FIG. 4 shows tilt eccentricity amounts measured according to an embodiment.

Then, the processor 120 converts the displacement amounts of the reflected light positions from the flat plate members 21 through 25 with respect to the reflected light from the reference-coordinate flat plate member 112 into the angular displacement amounts, and obtains (calculates) them as the tilt eccentricity amounts of the lens frames 11 through 15 (tilt eccentricity amount obtainment step). Note that when tilt eccentricity amounts are to be obtained, the image pickup apparatus 110 emits parallel light from a position facing the flat plate member 21, which is located at the outermost position among the flat plate members 21 through 25, in such a manner that the parallel light is transmitted through the flat plate members 21 through 25. The image pickup apparatus 110 functions as an example of an image pickup apparatus for obtaining information related to the angle of the reflected light of the parallel light from each of the flat plate members 21 through 25. Also, the processor 120 functions as an example of a processor that obtains, as a tilt eccentricity amount of each of the lens frames 11 through 15, the angular displacement amount $\epsilon$ of the reflected light of the parallel light from each of the flat plate members 21 through 25 with respect to an arbitrary reference axis. FIG. 4 shows the tilt eccentricity amounts obtained according to the present embodiment. In FIG. 4 similarly, the first through fifth lens frames 11 through 15 are denoted by "1G" through "5G". Also, in FIG. 4, the horizontal axis represents the angular displacement amount $\epsilon x$ [minute] of X components and the vertical axis represents the angular displacement amount $\epsilon y$ [minute] of Y components. Note that in FIG. 4, the optical axis (reference axis A) of the reflected light (an example of reflected light from the cradle 111) from the reference-coordinate flat plate member 112 is used as a reference. However, the reference axis may be selected arbitrarily, and the optical axis of any one of for example beams of reflected light from the flat plate members 21 through 25 (an example of the optical axis of reflected light from one flat plate member) may be used as a reference. As an example of effects, when the reference axis is the optical axis of the reflected light from the cradle 111 (reference-coordinate flat plate member 112), the reference axis can be set regardless of the eccentricity of the lens frames 11 through 15. Also, when the reference axis is the optical axis of the reflected light from the flat plate members 21 through 25, the structure of the eccentricity amount obtainment system including the eccentricity amount obtainment device 100 can be simplified by for example omitting the reference-coordinate flat plate member 112 etc.

When the above method is used for obtaining angle information, the angle information can be obtained regardless of the distance between the image pickup apparatus 110 and each flat plate member, and a laser auto collimator etc. may be used.

In FIG. 1 and FIG. 4, the lens frame 11 is oriented toward the image pickup apparatus 110 side and the lens frame 15 is oriented toward the cradle 111 side so as to measure tilt eccentricity amounts. However, the opposite orientation (with the lens frame 11 oriented toward the cradle 111 side and the lens frame 15 oriented toward the image pickup apparatus 110 side) may be adopted for the measurement.

The above described embodiment executes an assembly step in which the flat plate members 21 through 25 are arranged in the lens cells of the plurality of lens frames 11 through 15, the flat plate members 21 through 25 having the flat plate members 21 *a* through 25*a* formed thereon and having optical transparency, and the lens frames 11 through 15 are arranged in a lens barrel in a prescribed order so as to assemble the assembly 1. Next, an illumination light emission step is executed in which illumination light is emitted from a light source (not shown) to the flat plate members 21 through 25 and the reference-coordinate flat plate member 112. Further, a position information obtainment step is executed by for example the image pickup apparatus 110, in which position information on the X-Y plane orthogonal to the Z axis for each of the indexes 21a through 25a of the flat plate members 21 through 25 in the lens frames 11 through 15 and the index 112a of the reference-coordinate flat plate member 112 is acquired. Then, a shift eccentricity amount obtainment step is executed in which the displacement amounts (σ) of the positions of the indexes 21a through 25a of the flat plate members 21 through 25 with respect to an arbitrary reference position (for example the position of the index 112a of the reference-coordinate flat plate member 112) are obtained as the shift eccentricity amounts of the lens frames 11 through 15. This shift eccentricity amount obtainment step is executed by for example the processor 120.

Also, the present embodiment executes the assembly step, in which the flat plate members 21 through 25 having optical transparency are arranged in the lens cells of the plurality of lens frames 11 through 15 and the lens frames 11 through 15 are arranged in a lens barrel in a prescribed order so as to assemble the assembly 1. Next, the parallel light emission step is executed in which a light source (not shown) emits parallel light from a position facing the flat plate member 21, which is located at the outermost position among the flat plate members 21 through 25 that are arranged in the lens frames 11 through 15, in such a manner that the parallel light is transmitted through the flat plate members 21 through 25. Further, the angle information obtainment step is executed by for example the image pickup apparatus 110, in which angle information in the X-Y plane orthogonal to the Z axis for the reflected light of the parallel light from each of the flat plate members 21 through 25 in the lens frames 11 through 15 and the reference-coordinate flat plate member 112 is obtained. Then, the step of obtaining the angular displacement amounts (s) of the reflected light of the flat plate members 21 through 25 with respect to an arbitrary reference axis (the reflected light from the reference-coordinate flat plate member 112 for example) as the tilt eccentricity amounts of the lens frames 11 through 15 is executed.

Also, the present embodiment may obtain both the shift eccentricity amounts and the tilt eccentricity amounts of the lens frames 11 through 15. The present embodiment uses the flat plate members 21 through 25 having optical transparency so as to obtain the shift eccentricity amounts and the tilt eccentricity amounts of the lens frames 11 through 15 all at once and with a high accuracy without using a lens that is actually arranged in the lens barrel (not shown). Accordingly, the present embodiment makes it possible to obtain the shift eccentricity amounts and the tilt eccentricity amounts of lens frames in a lens barrel simply and highly accurately.

This makes it possible to feed the shift eccentricity amounts and tilt eccentricity amounts obtained for the lens frames 11 through 15 according to the present embodiment back to for example the modification of the shapes of mold portions of lens frames 11 through 15, i.e., the modification of the shapes of the dies that transfer the shapes to the mold portions. Also, it similarly makes it possible to feed the shift eccentricity amounts and tilt eccentricity amounts obtained for the lens frames 11 through 15 according to the present embodiment back to for example the amount of adhesive applied to the lenses that are actually arranged for assembling the lens barrel (not shown) and to methods of fixing respective components in the lens barrel (not shown).

The invention claimed is:

1. An eccentricity amount obtainment method of obtaining a shift eccentricity amount of a lens frame in a lens barrel including a plurality of lens frames that have lens cells, the eccentricity amount obtainment method comprising:
   arranging, in each of the lens cells, a flat plate member on which an index is formed and which has optical transparency and arranging the lens frames in the lens barrel in a prescribed order so as to assemble an assembly;
   emitting illumination light to the flat plate members;
   obtaining pieces of information related to positions of the indexes formed on the flat plate members; and
   obtaining, as the shift eccentricity amounts of the lens frames, the positional displacement amounts with respect to the indexes formed on the flat plate members with respect to an arbitrary position.

2. The eccentricity amount obtainment method according to claim 1, wherein
   the arbitrary reference position is the index of the flat plate member in one of the lens frames.

3. The eccentricity amount obtainment method according to claim 1, wherein
   the assembling of the assembly includes mounting the assembly on a cradle having an index, and
   the arbitrary reference position is the index of the cradle.

4. An eccentricity amount obtainment method of obtaining a tilt eccentricity amount of a lens frame in a lens barrel including a plurality of lens frames that have lens cells, the eccentricity amount obtainment method comprising:
   arranging, in each of the lens cells, a flat plate member which has optical transparency and arranging the lens frames in the lens barrel in a prescribed order so as to assemble an assembly;
   emitting a parallel light from a position facing a flat plate member arranged at an outermost position among the flat plate members, in such a manner that the parallel light is transmitted through the respective flat plate members;
   obtaining an angle information related to an angle of reflected light of the parallel light from each of the flat plate members; and
   obtaining a displacement amount of the angle with respect to the reflected light of the parallel light from each of the flat plate members with respect to an arbitrary reference axis as the tilt eccentricity amount of each of the lens frames.

5. The eccentricity amount obtainment method according to claim 4, wherein
   the arbitrary reference axis is an optical axis of the reflected light from one of the flat plate members.

6. The eccentricity amount obtainment method according to claim 4, wherein
   the assembling of the assembly includes mounting the assembly on a cradle; and
   the arbitrary reference axis is an optical axis of reflected light from the cradle.

7. An eccentricity amount obtainment device that obtains a shift eccentricity amount of a lens frame in a lens barrel including a plurality of lens frames that have lens cells, the eccentricity amount obtainment device comprising:
   an image pickup apparatus configured to emit illumination light to a flat plate member which is arranged in each of the plurality of lens cells, on which an index is formed, and which has optical transparency, and configured to obtain pieces of information related to positions of the indexes formed on the flat plate members; and a processor configured to obtain, as the shift eccentricity amounts of the lens frames, the positional displacement amounts with respect to the indexes formed on the flat plate members with respect to an arbitrary position.

8. An eccentricity amount obtainment device that obtains a tilt eccentricity amount of a lens frame in a lens barrel including a plurality of lens frames that have lens cells, the eccentricity amount obtainment device comprising:

an image pickup apparatus configured to emit parallel light from a position facing a flat plate member arranged at an outermost position among the flat plate members which are arranged in the plurality of lens cells and which have optical transparency, in such a manner that the parallel light is transmitted through the respective flat plate members, and configured to obtain information related to an angle of reflected light of the parallel light from each of the flat plate members; and a processor configured to obtain a displacement amount of the angle with respect to the reflected light of the parallel light from each of the flat plate members with respect to an arbitrary reference axis as the tilt eccentricity amount of each of the lens frames.

* * * * *